April 2, 1946. E. M. WANAMAKER ET AL 2,397,824
MANGANESE ORE REDUCTION TREATMENT
Filed Aug. 4, 1943 3 Sheets-Sheet 2
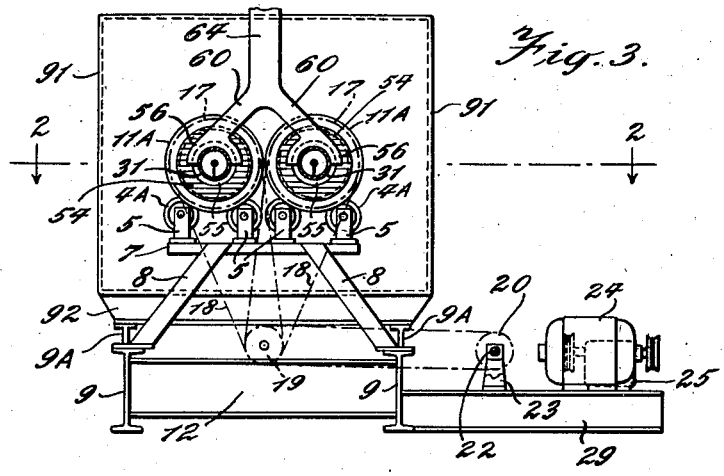
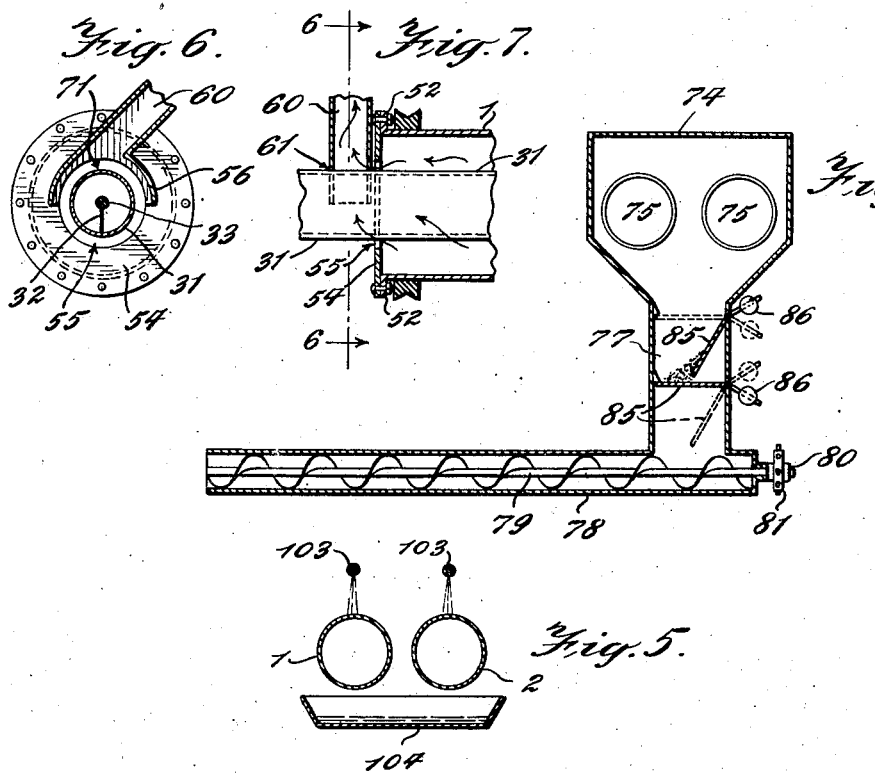
INVENTORS
ELMER M. WANAMAKER
ROBERT H. CROMWELL
HAROLD L. CHAMBERLAIN

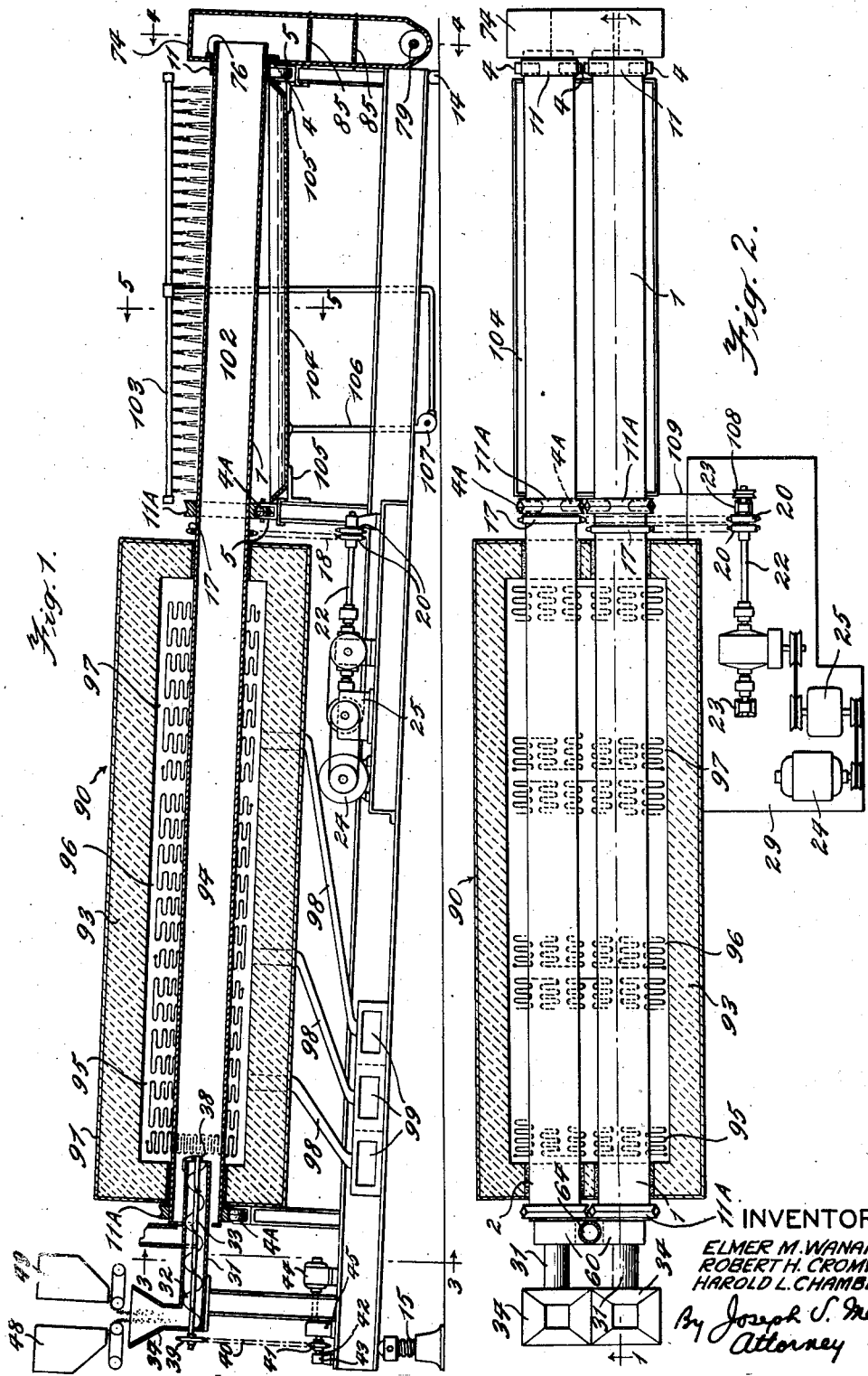

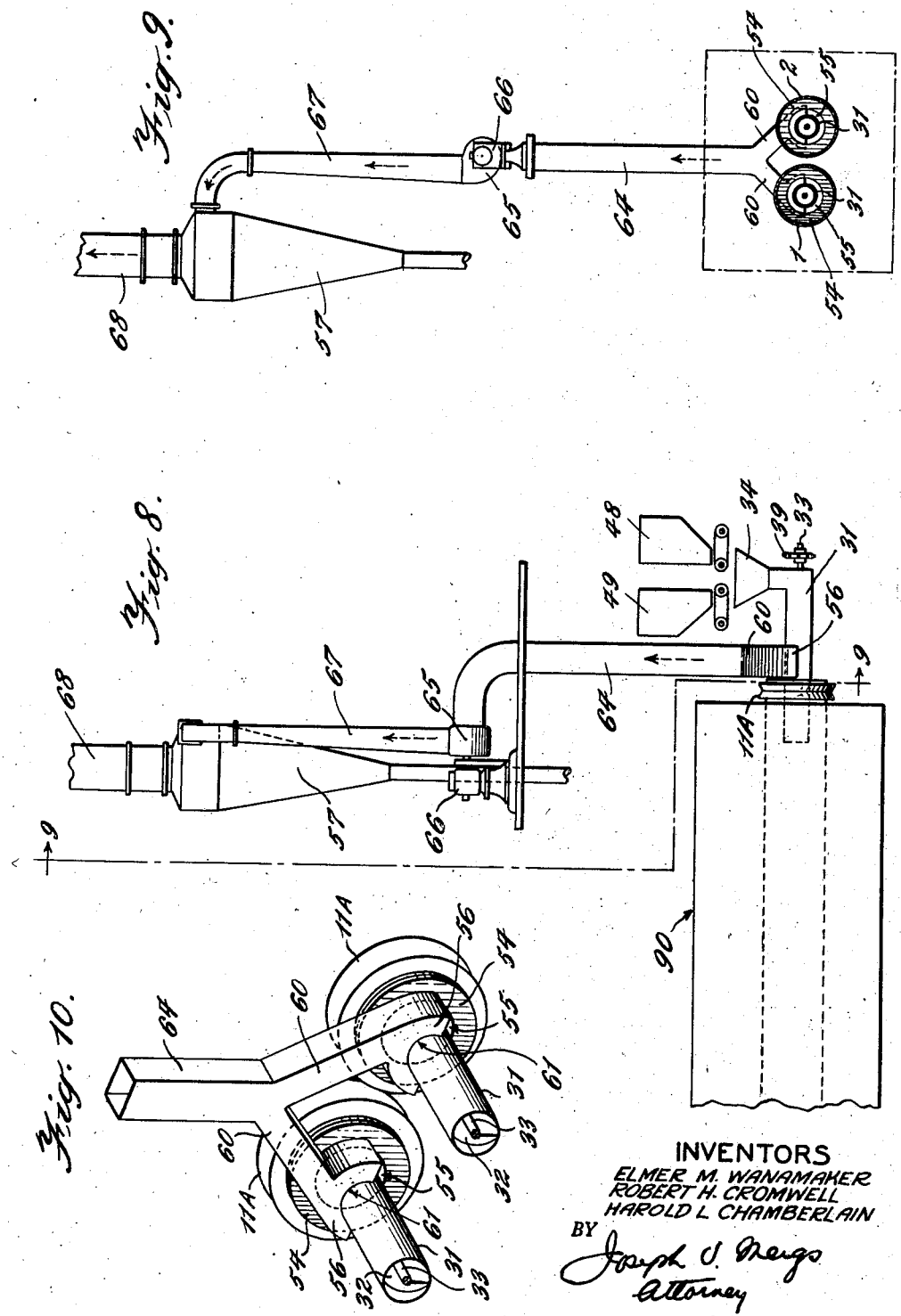

Patented Apr. 2, 1946

2,397,824

UNITED STATES PATENT OFFICE 2,397,824

MANGANESE ORE REDUCTION TREATMENT

Elmer M. Wanamaker, Knoxville, Tenn., Robert H. Cromwell, East Orange, N. J., and Harold L. Chamberlain, Knoxville, Tenn., assignors to Electro Manganese Corporation, Knoxville, Tenn., a corporation of Delaware Application August 4, 1943, Serial No. 497,352

11 Claims. (Cl. 23—145)

This invention relates to method and apparatus for effecting a thermal reduction of ores, particularly ores containing higher oxides of manganese, in order to reduce these higher oxides to a form readily soluble in acids.

In the electrowinning of manganese from its ores it is necessary first to convert the manganese in the ore into a soluble salt thereof, as for example by leaching with a mineral acid, sulphuric acid being commonly employed for this purpose. A high manganese extraction efficiency is a vital factor in the commercial success of the process. In some manganese ores the manganese naturally occurs in a form readily leachable therefrom by means of mineral acids, but in other ores, particularly those containing higher oxides of manganese, the latter is not efficiently extractable by direct treatment of the ore with the acid, and with such ores the problem of devising apparatus and process for conditioning the ore to render it efficiently extractable with acids has arisen.

One of the objects of the invention is the solution of that problem.

The principles of the invention as to process and apparatus will be defined in the appended claims and illustrated in the following description and drawings, in which:

Fig. 1 is a vertical section on the line 1—1 of Fig. 2;

Fig. 2 is a view partly in section on the line 2—2 of Fig. 3;

Fig. 3 is an elevational view partly in section on the line 3—3 of Fig. 1;

Fig. 4 is a sectional elevation on the line 4—4 of Fig. 1;

Fig. 5 is a section on the line 5—5 of Fig. 1;

Fig. 6 is a sectional view on the line 6—6 of Fig. 7;

Fig. 7 is a section on the line 7—7 of Fig. 6;

Fig. 8 is a fragmentary side elevation of one of the heating conduits and associated apparatus;

Fig. 9 is an end view partly in section on the line 9—9 of Fig. 8; and

Fig. 10 is a fragmentary perspective end view of two companion heating units and associated apparatus.

In the drawings a pair of heating conduits is shown. It will be necessary to describe only one in detail since the members of the pair are identical in structure. The conduit 1 shown in the drawings has a total length from end to end of about 30 feet and a diameter of about 1 foot and is made from heat resisting alloy steel. It is rotatably mounted on rollers 4 journaled in brackets 5 carried by suitable supporting structure including the table 7 having legs 8 carried on and supported by a pair of I-beams 9, the rollers 4 engaging bearing rings 11 welded to the conduit 1. At least one of the rings, 11A, is grooved and engages a bevelled roller 4A. These I-beams run the entire length of the apparatus as shown and are connected together and braced by cross members 12. The support comprising the I-beams 9 and cross members 12 rests pivotally at one end on a shoe 14 and at the other end on an adjustable jack 15 so that the supporting structure and conduit resting thereon may be given an adjustable inclination to the horizontal. Intermediate the ends of each of the conduits 1 and 2 there is provided an annular sprocket collar 17 driven by diagrammatically indicated sprocket chains 18 from the sprocket wheels 19 (only one of which is shown) which in turn are driven by the sprocket wheels 20 mounted on the shaft 22 journaled in the bearings 23, the said shaft 22 forming a part of a driving mechanism including the motor 24 and the speed reduction mechanism indicated generally as 25. The motor 24 and associated driving mechanism is supported on a platform 29 secured to the I-beams. At one end of the pair of heating conduits 1 and 2 there is provided means for feeding into each conduit a mixture of pulverized ore, e. g., manganese ore containing higher oxides of manganese and finely divided carbon. This comprises a screw conveyor (including the helical plates 32 carried on a shaft 33) and mounted partly within a conduit 31, one end of which conveyor terminates in a hopper 34 and the other end of which extends into the heating conduit and is open for the delivery of the mixture of ore and carbon into that heating conduit. A bracket carried by the screw conveyor at one end carries a bearing 38 in which the shaft 33 is mounted at the delivery end of the screw conveyor, the other end of the shaft 33 extending through the wall of the screw conveyor and carrying a sprocket wheel 39 which is driven by sprocket chain 40 from the sprocket wheel 41 carried on a shaft 42 journaled in a bearing 43 and driven by a motor 44 through speed reduction mechanism 45. Above the hopper are located endless conveyor belts receiving, respectively, pulverized ore and finely divided carbon from the storage bins 48, 49. Means not specifically shown are provided to proportion the finely divided carbon in relation to the ore to be reduced.

Each heating conduit has at the end thereof, an annular flange 52 (note Fig. 7) to which is welded or otherwise secured, e. g., by means of bolts, a collar 54 having a hole in the center thereof. The inside annular edges defining this hole are in spaced relation to the cylindrical wall 31 of the screw conveyor so that between that wall of said conveyor and the said annular edges of the hole in the collar there exists an annular space 55. The radial dimensions of this space may be controlled by providing collars having holes of varying diameters. The purpose of this annular space and the control of the size thereof is to provide adjustable orifice means to restrict the flow of gas from the inside to the outside of the heating conduit, to develop super-atmospheric pressure within the heating conduit and to cause a flow of gas from the inside to the outside of said conduit and will be further described.

Means are provided to vent gases produced within the heating conduit through this annular space 55 and to remove the vented gases and solid particles carried thereby through hoods 56 into a dust separator, e. g., the cyclone separator 57. (Note Figs. 8, 9 and 10.) The structure of the hoods is shown in Figs. 1, 2, 3, 6, 7, 8, 9 and 10. Each of the hood members has substantially vertical outer and inner walls 60 with semi-circular cut-out portions 61 corresponding to the curvature of the wall 31 of the screw conveyor. These walls are connected by lateral walls forming pipes which terminate in a common pipe 64 leading to the intake of a blower 65 driven by a motor 66. The blower discharges through a pipe 67 into the cyclone separator 57 from which the gas passes through the pipe 68 to a source of disposal. The two hoods 56 are fitted over the screw conveyor 31, the outside walls of the hoods being in contact with the conveyor and the inside walls of the hoods being spaced from said conveyor (note Fig. 7) to form a semi-annular space 71 corresponding to the annular space 55 between the screw conveyor and the collar 54 secured to the heating conduit. The inside walls of the hoods are positioned as close to the collars 54 as is possible, just enough clearance being provided to permit rotation of the conduit (note Figs. 7 and 8).

The discharge end of each heating conduit extends into a substantially gas-tight receptacle 74 through circular holes 75 therein and a flexible annular bushing 76 (note Fig. 1) is provided between the wall of the heating conduit and the edges of the holes 75 in order to maintain the gas seal. This bushing may be made of any suitable flexible gas-sealing material, as for example felt. The lower portion of the receptacle is restricted to form a conduit 77 which delivers the conditioned ore to a screw conveyor 78, the shaft 79 of which is journaled at one end in the bearing 80 and driven by a sprocket wheel 81. This sprocket wheel 81 is driven by any suitable means not specifically shown.

The conduit 77 of the receptacle is provided with self-operating valves in the nature of butterfly valves or swing gates 85. These are provided with counterweights 86 and automatically open and deliver ore when a predetermined weight of ore sufficient to dump the valves is delivered thereto. These valves assist in maintaining the receptacle in a substantially gas-tight condition.

Adjacent the feed end of the heating conduit and extending toward the discharge end for a length of about 15 feet, is a heating unit 90 which surrounds and heats the pair of heating conduits and provides a hot zone 94. This heating unit 90 may be, as shown, a substantially rectangular box having steel walls 91 and a number of lateral bracing members 92 carried at the bottom thereof (only one of which is shown—note Fig. 3) which in turn rest upon the longitudinally extending I-beams 9A which in turn are carried on the I-beams 9. This steel box may be lined with refractory brick 93 carrying electrical resistance heating units. These units may be divided into any desired number of independently controllable groups. The drawings show three groups 95, 96, 97, each of which is connected by leads 98 to a source of electrical heating current through pyrometer control boxes 99 which automatically maintain the magnitude of current delivered to each group and therefore the heat energy delivered thereto and the temperature developed thereby.

Adjacent the delivery end of the heating conduit and extending for a distance of about 15 feet, there is provided a cooling zone 102 as shown in the drawings (note Figs. 1, 2 and 5). This zone is provided by spray pipes 103 (note Fig. 5) from which water is sprayed on the surfaces of the heating conduits. The water so sprayed is received in a trough 104 supported beneath the conduits on brackets 105 which in turn are secured to the legs 8 of the supporting structure on which the heating conduits and their associated parts are supported. Pipes 106 and a pump 107 circulate water from the trough to a cooling tower (not shown) and then to the spray pipe. The pump 107 may be driven from a pulley 108 on the shaft 22 as indicated by line 109 in Fig. 2.

In accordance with the process of the invention, a proportioned mixture of pulverized manganese ore and finely divided carbon is obtained in substantially dry condition, e. g., by feeding dry ore and dry carbon from the bins 48 and 49 to hopper 34 and screw conveyor 31. While finely divided carbon in general may be used, it is preferred to employ the carbon in a form as pure as possible, as for example powdered charcoal or coke, and it is preferred to employ at least about 0.9 of one atomic weight of carbon for each atomic weight of manganese in the ore, the purpose being to employ an excess of carbon over that theoretically necessary to reduce the higher oxides in the ore to the manganous condition. The dry mixture is then passed as a confined stream in a substantially horizontal path through a heated zone of an externally heated conduit, e. g., from screw conveyor 31 through hot zone 94. The temperature of the heated zone is maintained (e. g., by heating units 95, 96, 97) sufficiently high to effect a reduction of the higher oxides of manganese to the manganous condition, and the time of exposure of the mixture of ore and carbon is controlled so as to render at least about 95 percent of the manganese in the ore soluble in dilute sulphuric acid. In other words, the criterion for controlling the time of exposure of the ore to said high temperature is the extraction efficiency of the manganese in the reduced ore, and this extraction efficiency should be at least about 95 percent.

In a typical case the temperature developed by the heating units 95, 96, 97 (which is approximately the temperature within the heating conduit) is about 900° C. It is preferably at least about this temperature and may vary within a range of, for example, about 850° C. to about 1050° C. In the apparatus shown the time of exposure of the ore to a given high temperature (the length of the heating zone 94 and the diameter of each heating conduit being fixed) will be a function of the rate of feed of the mixture of ore and carbon, the longitudinal inclination of the heating conduit and speed of rotation thereof. In a typical case and employing the apparatus above described, these variables may be stated as about 750 pounds per hour of ore plus 10% by weight of reducing agent, an inclination of the heating conduit to the horizontal of about one inch in three longitudinal feet, and a speed of rotation of the heating conduit of 3 to 6 R. P. M. The resulting time of exposure of the mixture of carbon and ore in the hot zone 94 is about 15 minutes and since the length of that zone is about 13 feet, the velocity of forward movement of said mixture is of the order of 1 linear foot per minute. It will be understood that the step of passing the substantially dry mixture of ore and carbon as a confined stream in a substantially horizontal path through a heated zone at a predetermined high temperature and controlling the time of exposure to obtain an extraction efficiency of at least about 95 percent of the maganese in the ore, is not limited to the use of a longitudinally inclined rotating conduit but may also be effected by other specific apparatus means, as for example a horizontal conduit with a screw conveyor extending therethrough.

As the mixture passes through the hot zone 94, reaction of the carbon with the ore produces a gas containing both carbon monoxide and carbon dioxide and it is desired to exclude air. The preferred manner of excluding air is to generate the said gas at a rate sufficient to maintain it within said conduit at super-atmospheric pressure, vent it through controlled orifice means and thus cause a controlled flow of gas from the inside to the outside of said heating conduit. The mixture may be fed to the conduit at a rate which will generate gas at a rate sufficient to maintain it within the conduit at super-atmospheric pressure. The gas thus produced will be vented through the annular space or orifice 55 between the screw conveyor 31 and the collar 54 and thence into the pipe 64. The rate of feed may be correlated with the size of the annular orifice to cause the development of a predetermined super-atmospheric pressure and a restricted flow of gas from the heating conduits into the hoods 56. In a typical case and at a rate of feed of about 750 pounds per hour of mixture to be reduced, the radial length of the annular orifice between the screw conveyor 31 and the collar 54 is about three-quarters to one and one-half inches. Under these conditions the gas pressure within the conduit may be of the order of ½ to 4 inches of water. To secure a higher pressure the size of the orifice may be reduced and/or the rate of feed of the mixture of ore and carbon increased. It will of course be understood that various orifice means other than that specifically illustrated may be employed. The super-atmospheric pressure developed by correlating the rate of feed with the dimensions of the orifice not only excludes air but also tends to speed up the reaction of the reducing atmosphere on the ore. It will also be noted that the gas passes counter-current to the advancing ore and that in the specific illustration described the mixture of ore and carbon is continuously agitated with the gas as it passes toward the feed end counter-current to the mixture advancing toward the discharge end of the conduit.

Typical gas analyses of the gas generated within the conduit under the above mentioned conditions show from about 23 to about 29 percent carbon monoxide and 46 to 52 percent carbon dioxide and the balance substantially all nitrogen and inert gases. The gas is substantially free from water vapor, hydrogen and hydrocarbons and is either free from oxygen or contains such a small amount of oxygen, e. g., 1 per cent, that the latter element does not impair substantially the extraction efficiency of the reduced ore. Freedom from water vapor is secured both by using a substantially dry mixture of ore and carbon and also avoiding the use of reducing agents containing substantial proportions of hydrogen in free or chemically combined condition. The gas preferably contains a minimum of 10 to 20 percent carbon monoxide and a ratio of carbon dioxide to monoxide of not more than about 2 to 1.

The development of super-atmospheric pressure causing a flow of gas from the inside of the conduit to the outside is a practical and efficient means of excluding air from the interior of the heating conduits, and that is its primary purpose. Since, however, other means of excluding air may be employed, the process of the invention is not generically limited to the specific air-exclusion step herein disclosed and the apparatus elements for effecting that step.

As the mixture passes through the heating conduit it is preferably continuously agitated with the said gas in both the hot and cool zones 94 and 102. In the specific apparatus shown this agitation may be effected at least in part by the continuous tumbling of the mixture by the rotation of the heating conduits 1 and 2. Rabbling may also be employed to assist in the agitation, as for example by means of a rabbling tool inserted through the annular space 55 between the screw conveyor and the collar. It will be understood that the inclined conduit shown in the drawings is regarded as substantially horizontal for the purpose of the method of the invention. It will be possible to effect the agitation in a strictly horizontal conduit by various means which will be clear to those skilled in the art, in the light of the present disclosures.

After the mixture has passed the hot zone 94 it then passes into the cool zone 102 and is there cooled in contact with the gas generated in the hot zone. In the cool zone the mixture may be cooled to approximately room temperature. From the cool zone the mixture discharges into the receptacle 74 and then passes out of the apparatus via the screw conveyor. The said receptacle 74 is of course also charged with the gas generated in the hot zone so that the reduced ore may be maintained in contact with the gas until it leaves the apparatus and is sent to a place of disposal, as for example a station for extraction.

We claim:

1. Process which comprises mixing finely divided manganese ore with finely divided carbon and obtaining a mixture in substantially dry condition containing at least about 0.9 of one atomic weight of carbon to one atomic weight of manganese, passing the dry mixture as a confined stream in a substantially horizontal path through an externally heated conduit having a feed end and a discharge end, providing a hot zone by heating a portion of said conduit adjacent the feed end thereof to a temperature at which reduction of higher oxides of manganese to manganous oxide occurs with generation of a gas containing carbon monoxide and carbon dioxide and substantially free from water vapor, generating said gas at a rate sufficient to maintain said gas within said conduit at slightly super-atmospheric pressure, cooling a portion of said conduit adjacent the discharge end and thereby providing a cooling zone; cooling the mixture in said cooling zone, in contact with said gas; exposing said mixture in said hot zone to said temperature for a time sufficient to render at least about 95 percent of the manganese in the ore soluble in dilute sulphuric acid, maintaining the discharge end of the conduit in a substantially gas-tight condition and withdrawing from said discharge end cooled reduced ore containing free carbon.

2. Process which comprises mixing finely divided manganese ore with finely divided carbon and obtaining a mixture in substantially dry condition containing at least about 0.9 of one atomic weight of carbon to one atomic weight of manganese, passing the said mixture as a confined stream in a substantially horizontal path through an externally heated conduit having a feed end and a discharge end, providing a hot zone by heating a portion of said conduit adjacent the feed end thereof to a temperature at which reduction of higher oxides of manganese to manganous oxide occurs with generation of a gas containing carbon monoxide and carbon dioxide and substantially free from water vapor, generating said gas at a rate sufficient to maintain said gas within said conduit at slightly super-atmospheric pressure, continuously agitating the mixture in contact with said gas, cooling a portion of said conduit adjacent the discharge end thereof and thereby providing a cooling zone; cooling the mixture in said cooling zone, in contact with said gas; exposing said mixture in said hot zone to said temperature for a time sufficient to render at least about 95 percent of the manganese in the ore soluble in dilute sulphuric acid, maintaining the discharge end of the conduit in a substantially gas-tight condition and withdrawing from said discharge end cooled reduced ore containing free carbon.

3. Process which comprises mixing finely divided manganese ore with finely divided carbon and obtaining a mixture in substantially dry condition containing at least about 0.9 of one atomic weight of carbon to one atomic weight of manganese, passing the said mixture as a confined stream in a substantially horizontal path through an externally heated conduit having a feed end and a discharge end, providing a hot zone by heating a portion of said conduit adjacent the feed end thereof to a temperature at which reduction of higher oxides of manganese to manganous oxide occurs with generation of a gas containing carbon monoxide and carbon dioxide and substantially free from water vapor, maintaining at all points within said conduit a free gaseous space; generating said gas at a rate sufficient to maintain said gas within said conduit at slightly super-atmospheric pressure; cooling a portion of said conduit adjacent the discharge end and thereby providing a cooling zone; cooling the mixture in said cooling zone, in contact with said gas; exposing said mixture in said hot zone to said temperature for a time sufficient to render at least about 95 percent of the manganese in the ore soluble in dilute sulphuric acid, maintaining the discharge end of the conduit in a substantially gas-tight condition and withdrawing from said discharge end cooled reduced ore containing free carbon.

4. Process which comprises mixing finely divided manganese ore, containing a higher oxide of manganese, with finely divided carbon and obtaining a mixture in dry condition containing at least about 0.9 of one atomic weight of carbon to one atomic weight of manganese, passing the dry mixture as a confined stream in a substantially horizontal path through an externally heated conduit having a feed end and a discharge end; providing a hot zone by heating a portion of said conduit adjacent the feed end thereof to a temperature of about 850° C. to about 1050° C. at which reduction of higher oxides of manganese to manganous oxide occurs with generation of a gas containing carbon monoxide and carbon dioxide and substantially free from water vapor; maintaining at all points within said conduit a free gaseous space; generating said gas at a rate sufficient to maintain said gas within said conduit at slightly super-atmospheric pressure, continuously rotating the conduit and advancing the mixture from the feed end to the discharge end in contact with said gas; cooling a portion of said conduit adjacent the discharge end and thereby providing a cooling zone; cooling the mixture in said cooling zone, in contact with said gas; exposing said mixture in said hot zone to said temperature for a time sufficient to render at least about 95 percent of the manganese in the ore soluble in dilute sulphuric acid, maintaining the discharge end of the conduit in a substantially gas-tight condition and withdrawing from said discharge end dry, cooled reduced ore containing free carbon.

5. Process which comprises mixing finely divided manganese ore with finely divided carbon and obtaining a mixture in dry condition containing at least about 0.9 of one atomic weight of carbon to one atomic weight of manganese, passing the dry mixture as a confined stream in a substantially horizontal path through an externally heated conduit having a feed end and a discharge end; providing a hot zone by heating a portion of said conduit adjacent the feed end thereof to a temperature at which reduction of higher oxides of manganese to manganous oxide occurs with generation of a gas containing carbon monoxide and carbon dioxide and substantially free from water vapor; maintaining at all points within said conduit a free gaseous space; generating said gas at a rate sufficient to maintain said gas within said conduit at slightly super-atmospheric pressure; continuously rotating the conduit; venting said gas at the feed end of the conduit; cooling a portion of said conduit adjacent the discharge end thereof and thereby providing a cooling zone; cooling the mixture in said cooling zone, in contact with said gas, to about room temperature; exposing said mixture in said hot zone to said temperature for a time sufficient to render at least about 95 percent of the manganese in the ore soluble in dilute sulphuric acid, maintaining the discharge end of the conduit in a substantially gas-tight condition and withdrawing from said discharge end dry, cooled reduced ore containing free carbon.

6. Process which comprises mixing finely divided manganese ore containing a higher oxide of manganese with finely divided carbon and obtaining the mixture in substantially dry condition; feeding said dry mixture to the feed end of an elongated heating conduit having a substantially horizontal axis, a feed end and a substantially gas-tight discharge end, said feed end having means providing an orifice for the flow of gas from the inside of said conduit to the outside thereof; advancing said dry mixture as a confined stream through said conduit from the feed end to the discharge end; providing a hot zone by heating a portion of said conduit adjacent the feed end to a temperature at which reduction of higher oxides of manganese to manganous oxide occurs; generating within said conduit, by reaction between the carbon and ore, a gas containing carbon monoxide and carbon dioxide and substantially free from water vapor; venting said gas at the feed end of said conduit through said restricted orifice; cooling a portion of said conduit adjacent the discharge end and thereby providing a cooling zone; cooling the mixture in said cooling zone in contact with said gas; exposing said mixture in said hot zone to said temperature for a time sufficient to render at least about 95 percent of the manganese in the ore soluble in dilute sulphuric acid; correlating the rate of feed of said mixture of ore and carbon with the dimensions of said restricted orifice and thereby maintaining the pressure of said gas within said conduit at a slightly super-atmospheric pressure, and withdrawing from said discharge end cooled reduced ore.

7. Process which comprises mixing finely divided manganese ore containing a higher oxide of manganese with finely divided carbon and obtaining the mixture in substantially dry condition; feeding said dry mixture to the feed end of an elongated heating conduit having a substantially horizontal axis, a feed end and a substantially gas-tight discharge end, said feed end having means providing for a restricted flow of gas from the inside to the outside of said conduit; advancing said dry mixture as a confined stream through said conduit from the feed end to the discharge end; providing a hot zone by heating a portion of said conduit adjacent the feed end to a temperature at which reduction of higher oxides of manganese to manganous oxide occurs; generating within said conduit, by reaction between the carbon and ore, a gas containing carbon monoxide and carbon dioxide and substantially free from water vapor; venting said gas at the feed end of said conduit through said restricted opening; cooling a portion of said conduit adjacent the discharge end and thereby providing a cooling zone; cooling the mixture in said cooling zone in contact with said gas; exposing said mixture in said hot zone to said temperature for a time sufficient to render at least about 95 percent of the manganese in the ore soluble in dilute sulphuric acid; correlating the rate of feed of said mixture of ore and carbon with the dimensions of said restricted flow means and thereby excluding air by maintaining a flow of said gas from the inside to the outside of said heating conduit, and withdrawing from said discharge end dry, cooled reduced ore.

8. Process which comprises mixing finely divided manganese ore containing a higher oxide of manganese with finely divided carbon and obtaining the mixture in substantially dry condition; feeding said dry mixture to the feed end of an elongated heating conduit having a substantially horizontal axis, a feed end and a substantially gas-tight discharge end, said feed end having a restricted opening of predetermined dimensions; advancing said dry mixture as a confined stream through said conduit from the feed end to the discharge end; providing a hot zone by heating a portion of said conduit adjacent the feed end to a temperature at which reduction of higher oxides of manganese to manganous oxide occurs; generating within said conduit, by reaction between the carbon and ore, a gas containing carbon monoxide and carbon dioxide and substantially free from water vapor, hydrogen and hydrocarbons and containing a minimum of about 10 to 20 percent carbon monoxide and a ratio of carbon dioxide to carbon monoxide of not more than about 2 to 1; venting said gas at the feed end of said conduit through said restricted opening; cooling a portion of said conduit adjacent the discharge end and thereby providing a cooling zone; cooling the mixture in said cooling zone in contact with said gas; exposing said mixture in said hot zone to said temperature for a time sufficient to render at least about 95 percent of the manganese in the ore soluble in dilute sulfuric acid; correlating the rate of feed of said mixture of ore and carbon with the dimensions of said restricted opening and thereby maintaining the pressure of said gas within said conduit at a slightly super-atmospheric pressure, and withdrawing from said discharge end cooled reduced ore.

9. Process which comprises mixing finely divided manganese ore containing a higher oxide of manganese with finely divided carbon and obtaining the mixture in substantially dry condition, containing carbon and manganese in the ratio of at least about one atomic weight of carbon to one atomic weight of manganese, feeding said dry mixture to the feed end of an elongated cylindrical heating conduit having a substantially horizontal straight line axis, a feed end and a substantially gas-tight discharge end and being mounted to rotate about said horizontal axis, said feed end having restricted opening means of predetermined dimensions; advancing said dry mixture as a confined stream through said conduit from the feed end to the discharge end; providing a hot zone by heating a portion of said conduit adjacent the feed end to a temperature at which reduction of said higher oxides of manganese to manganous oxide occurs; generating within said conduit, by reaction between the carbon and ore, a gas containing carbon monoxide and carbon dioxide and substantially free from water vapor; continuously rotating the conduit; venting said gas at the feed end of said conduit through said restricted opening means; cooling a portion of said conduit adjacent the discharge end and thereby providing a cooling zone; cooling the mixture in said cooling zone in contact with said gas to about room temperature; exposing said mixture in said hot zone to said temperature for a time sufficient to render at least about 95 percent of the manganese in the ore soluble in dilute sulphuric acid; correlating the rate of feed of said mixture of ore and carbon with the dimensions of said restricted opening means and thereby maintaining the pressure of said gas within said conduit at a slightly super-atmospheric pressure, and withdrawing from said discharge end dry, cooled reduced ore.

10. Process which comprises mixing finely divided manganese ore containing a higher oxide of manganese with finely divided carbon and obtaining the mixture in substantially dry condition, containing carbon and manganese in the ratio of at least about one atomic weight of carbon to one atomic weight of manganese; feeding said dry mixture to the feed end of an elongated cylindrical heating conduit having a substantially horizontal straight line axis, a feed end and a substantially gas-tight discharge end and being mounted to rotate about said horizontal axis, said feed end having restricted opening means; advancing said dry mixture as a confined stream through said conduit from the feed end to the discharge end; providing a hot zone by heating a portion of said conduit adjacent the feed end to a temperature at which reduction of said higher oxides of manganese to manganous oxide occurs; generating within said conduit, by reaction between the carbon and ore, a gas containing carbon monoxide and carbon dioxide and substantially free from water vapor and passing said gas counter-current to the advancing mixture of ore and carbon; continuously rotating the conduit; venting said gas at the feed end of said conduit through said restricted opening means; cooling a portion of said conduit adjacent the discharge end and thereby providing a cooling zone; cooling the mixture in said cooling zone in contact with said gas to about room temperature; exposing said mixture in said hot zone to said temperature for a time sufficient to render at least about 95 percent of the manganese in the ore soluble in dilute sulphuric acid; correlating the rate of feed of said mixture of ore and carbon with the dimensions of said restricted opening means and thereby maintaining the pressure of said gas within said conduit at a slightly super-atmospheric pressure, and withdrawing from said discharge end cooled reduced ore.

11. Process which comprises mixing pulverized manganese ore with finely divided carbon and obtaining a mixture in substantially dry condition containing carbon and manganese in the ratio of at least about one atomic weight of carbon to one atomic weight of manganese; feeding said mixture to a substantially horizontal heating conduit having a substantially gas-tight discharge end and a feed end and orifice means at the feed end to provide a restricted flow of gas from the inside to the outside of said conduit and passing said dry mixture as a confined stream in a substantially horizontal path through said conduit; providing a hot zone by heating a portion of said conduit adjacent the feed end to a temperature at which reduction of higher oxides of manganese to manganous oxide occurs with generation of a gas by reaction of the carbon with the ore, said gas containing carbon monoxide and carbon dioxide and substantially free from water vapor; generating said gas at a rate sufficient to maintain said gas within said conduit at slightly super-atmospheric pressure, and passing said gas counter-current to the advancing mixture; venting said gas at the feed end of the conduit through said orifice means; cooling a portion of said conduit adjacent the discharge end and thereby providing a cooling zone; cooling the mixture in said cooling zone, in contact with said gas, to about room temperature; exposing said mixture in said hot zone to said temperature for a time sufficient to render at least 95 percent of the manganese in the ore soluble in dilute sulphuric acid; maintaining the discharge end of the conduit in a substantially gas-tight condition, and withdrawing from said discharge end cooled reduced ore containing free carbon.

ELMER M. WANAMAKER.
ROBERT H. CROMWELL.
HAROLD L. CHAMBERLAIN.